United States Patent
Yang et al.

(10) Patent No.: US 8,205,133 B2
(45) Date of Patent: Jun. 19, 2012

(54) ERROR CORRECTOR WITH A HIGH USE EFFICIENCY OF A MEMORY

(75) Inventors: Ying-Chih Yang, Hsinchu (TW);
Chieh-Chien Huang, Hsinchu (TW);
Kuo-Ming Wang, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1267 days.

(21) Appl. No.: 11/976,982

(22) Filed: Oct. 30, 2007

(65) Prior Publication Data

US 2008/0104483 A1    May 1, 2008

(30) Foreign Application Priority Data

Oct. 31, 2006  (TW) ................. 95140208 A

(51) Int. Cl.
*H03M 13/00* (2006.01)
*G11C 29/00* (2006.01)
*G06F 11/00* (2006.01)

(52) U.S. Cl. .......... 714/758; 714/763; 714/805; 710/22; 710/52

(58) Field of Classification Search ................. 714/758, 714/763, 769, 805; 710/52, 22, 308
See application file for complete search history.

(56) References Cited

U.S. PATENT DOCUMENTS 6,332,206 B1 * 12/2001 Nakatsuji et al. ............. 714/755
7,779,333 B2 *  8/2010 Taito et al. .................... 714/763

OTHER PUBLICATIONS

Asakura, M.; Matsuda, Y.; Hidaka, H.; Tanaka, Y.; Fujishima, K.; , "An experimental 1-Mbit cache DRAM with ECC," Solid-State Circuits, IEEE Journal of , vol. 25, No. 1, pp. 5-10, Feb. 1990.*
Micheloni et al "A 4Gb 2b/cell NAND Flash Memory with Embedded 5b BCH ECC for 36MB/s System Read Throughput," Solid-State Circuits Conference, 2006. ISSCC 2006. Digest of Technical Papers. IEEE International , vol., no., pp. 497-506, Feb. 6-9, 2006.*

* cited by examiner

*Primary Examiner* — Cynthia Britt
(74) *Attorney, Agent, or Firm* — Bacon & Thomas, PLLC

(57) ABSTRACT

An error corrector with a high use efficiency of a memory includes a memory, a bus device, an input buffer and an error correction module. The memory stores data. The bus device controls a memory access. The input buffer receives and temporarily stores a coded blockcode data, and writes the coded blockcode data in the memory through the bus device. The error correction module reads the coded blockcode data in the memory through the bus device and decodes it in rows and columns to thereby obtain decoded data and check bytes. The error correction module writes the decoded data in the memory through the bus device and discards the check bytes.

19 Claims, 5 Drawing Sheets

ERROR CORRECTOR WITH A HIGH USE EFFICIENCY OF A MEMORY

BACKGROUND OF THE INVENTION

1. Field of the Invention

The invention relates to the technical field of error correction and, more particularly, to an error corrector with a high use efficiency of a memory.

2. Description of Related Art

A digital versatile disc (DVD) data structure consists of consecutive error correction code (ECC) blocks. The ECC blocks are a data block with the capability of error correction. Typically, a DVD has at least 143,500 ECC blocks.

When a DVD drive reads a DVD, it can correct errors in reading data blocks. FIG. 1 is a schematic diagram of a primary memory used by a typical error corrector. As shown in FIG. 1, ECC block #3 is an uncorrected ECC block, ECC block #2 is a correcting ECC block, and ECC block #1 is a corrected ECC block.

FIG. 2 is a timing diagram of a typical error corrector. As shown in FIG. 2, at T1, the error corrector inputs an uncorrected ECC block EFM #1 through a data channel. At T2, the error corrector inputs an uncorrected ECC block EFM #2 through the data channel, and performs an error correction ECC #1 on the previously input ECC block EFM #1. At T3, the error corrector inputs an uncorrected ECC block EFM #3 through the data channel, performs an error correction ECC #2 on the previously input ECC block EFM #2, and outputs the corrected ECC block DMA #1.

However, since the corrected ECC block DMA #1 output by the error corrector contains decoded data and check bytes, the amount of used memory is increased and bandwidth in memory access is required.

Therefore, it is desirable to provide an improved error corrector to mitigate and/or obviate the aforementioned problems.

SUMMARY OF THE INVENTION

An object of the invention is to provide an error corrector with a high use efficiency of a memory, which can reduce the amount of used memory to thereby reduce the cost.

Another object of the invention is to provide an error corrector with a high use efficiency of a memory, which can reduce the amount of required bandwidth in memory access to thereby increase the system performance.

Another object of the invention is to provide an error corrector with a high use efficiency of a memory, which can enhance the use efficiency of a memory.

In accordance with one aspect of the invention, there is provided an error corrector with a high use efficiency of a memory. The error corrector includes a memory, a bus device, an input buffer and an error correction module. The memory stores data. The bus device is connected to the memory in order to control an access of the memory. The input buffer receives and temporarily stores a coded blockcode data, and writes the coded blockcode data in the memory through the bus device. The error correction module is connected to the bus device in order to read the coded blockcode data in the memory through the bus device and decodes it in rows and columns to thereby obtain decoded data and check bytes. The error correction module writes the decoded data in the memory through the bus device and discards the check bytes.

In accordance with another aspect of the invention, there is provided an error corrector with a high use efficiency of a memory. The error corrector includes a memory, a bus device, an input buffer, an error correction module and a direct memory access (DMA) output module. The memory stores data. The bus device is connected to the memory in order to control an access of the memory. The input buffer receives and temporarily stores an uncorrected coded blockcode data, and writes the uncorrected coded blockcode data in the memory through the bus device. The error correction module is connected to the bus device in order to read the uncorrected coded blockcode data in the memory through the bus device and decodes it in rows and columns to thereby obtain decoded data and check bytes. The DMA output module is connected to the bus device in order to read and output the decoded data in the memory through the bus device. The uncorrected coded blockcode data stored in the input buffer is written in the memory. The error correction module performs a correction on a primary data and the check byte of the uncorrected coded blockcode data to thereby produce the decoded data and the check bytes. The decoded data is written in the memory through the bus device, and the check bytes are discarded. The DMA output module fetches the decoded data associated with a previous coded blockcode data in the memory for performing a DMA operation.

Other objects, advantages, and novel features of the invention will become more apparent from the following detailed description when taken in conjunction with the accompanying drawings.

DETAILED DESCRIPTION OF THE PREFERRED EMBODIMENT

The error corrector with a high use efficiency of a memory in accordance with the invention receives a coded signal from a data channel after channel coding, and uses the redundancy information of the coded signal to update the coded signal.

Figure 1:
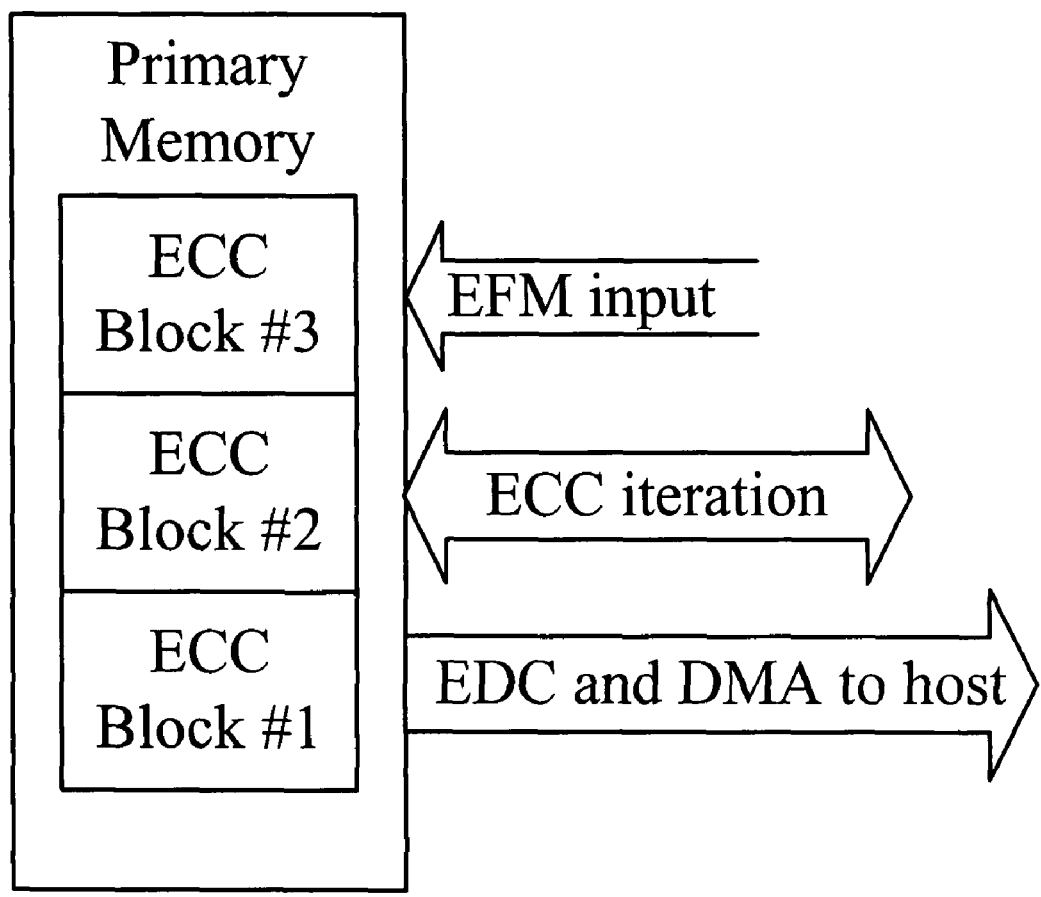
FIG. 1 is a schematic diagram of a primary memory used by a typical error corrector.
Figure 2:
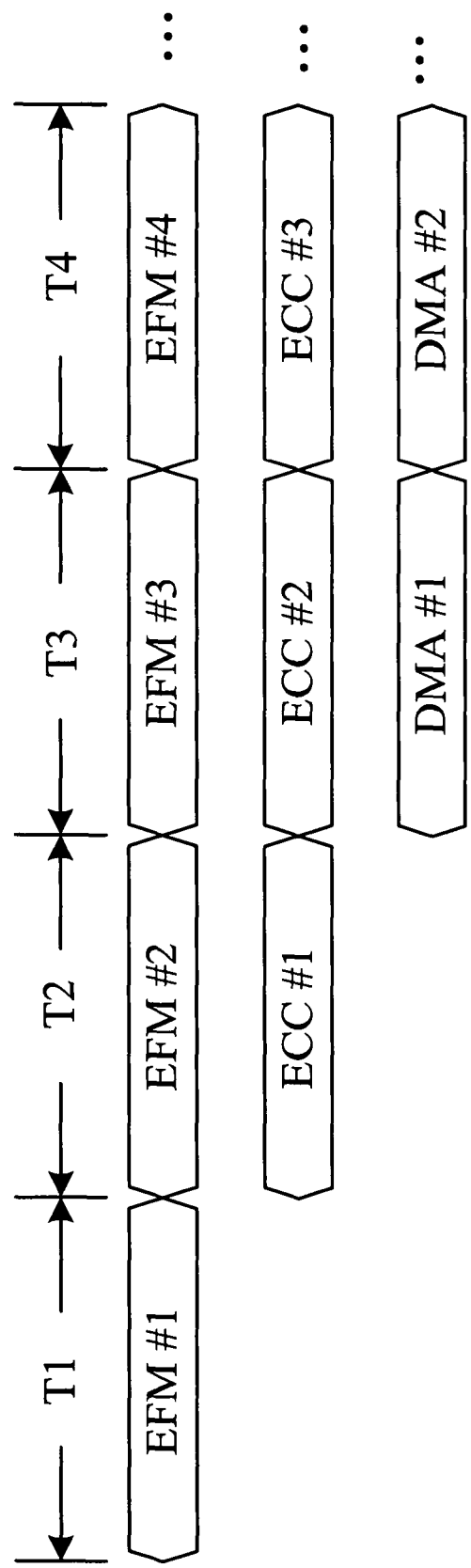
FIG. 2 is a schematic diagram of a timing of a typical error corrector.
Figure 3:
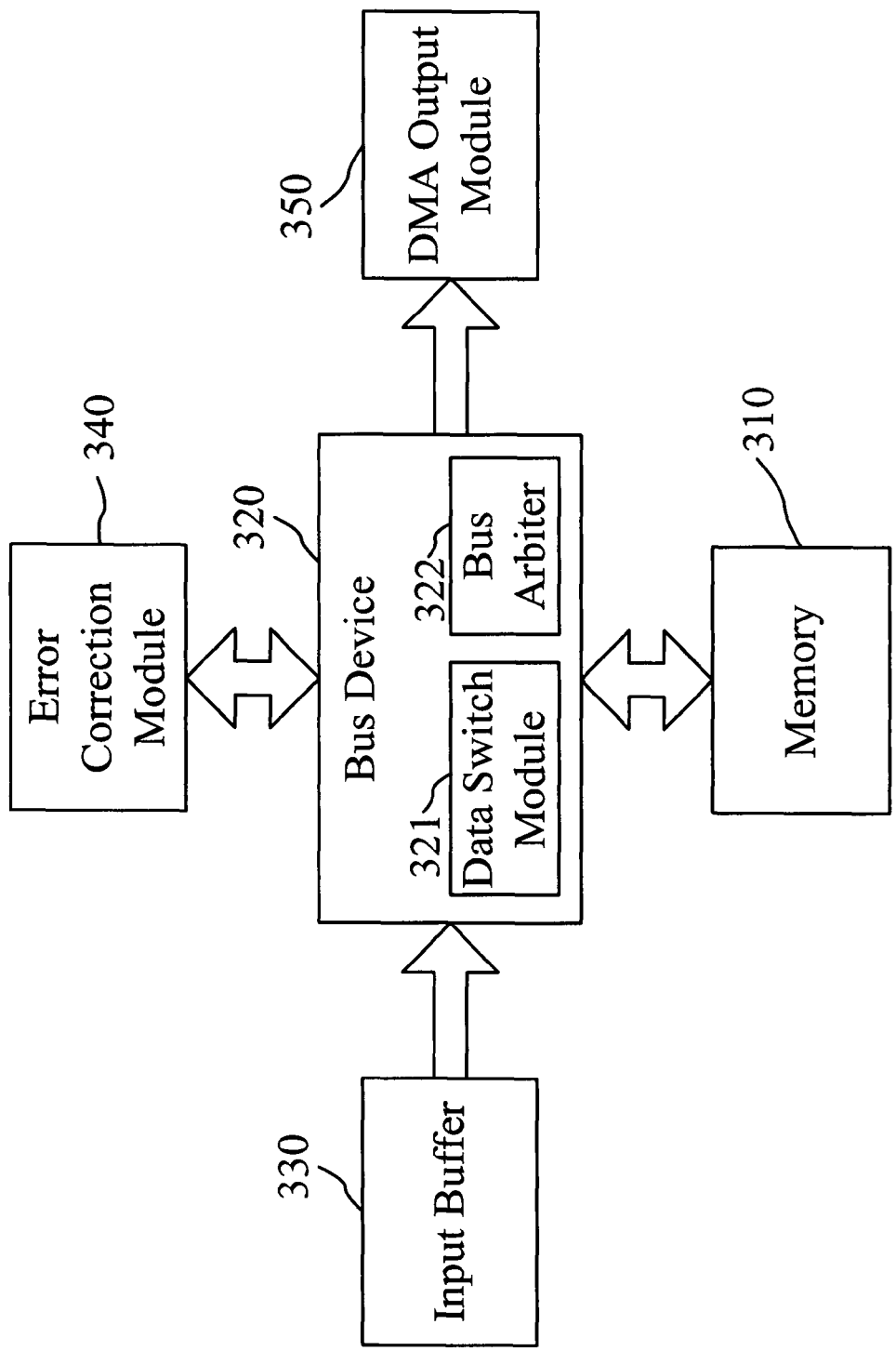
FIG. 3 is a block diagram of an error corrector with a high use efficiency of a memory in accordance with the invention.

FIG. 3 is a block diagram of an error corrector with a high use efficiency of a memory in accordance with the invention. The error corrector includes a memory 310, a bus device 320, an input buffer 330, an error correction module 340 and a direct memory access (DMA) output module 350.

The memory 310 stores data. The memory 310 is a dynamic random access memory (DRAM). The DRAM can be a synchronous dynamic random access memory (SDRAM) or double data rate DRAM. When the DRAM is the double data rate DRAM, the double data rate DRAM can be DDR-I, DDR-II, DDR-333, DDR-400 and so on.

The bus device 320 is connected to the memory 310 in order to control an access of the memory 310. The bus device 320 includes a data switch module 321 and a bus arbiter 322. The data switch module 321 transfers data among the memory 310, the input buffer 330, the error correction module 340 and the DMA output module 350.

The bus arbiter 322 determines a priority of the input buffer 330, the error correction module 340 and the DMA output module 350 for accessing the memory. The bus arbiter 322 uses a fixed-priority scheme to determine the priority of the input buffer 330, the error correction module 340 and the DMA output module 350 for accessing the memory 310. In other embodiments, the bus arbiter 322 can use a round-robin scheme to determine the priority of the input buffer 330, the error correction module 340 and the DMA output module 350 for accessing the memory 310.

The input buffer 330 receives and temporarily stores an uncorrected coded blockcode data from the data channel, and writes the uncorrected coded blockcode data in the memory 310 through the bus device 320. The coded blockcode data is a linear blockcode before coded. The coded blockcode data is coded by a Reed-Soloman coding.

The error correction module 340 is connected to the bus device 320 in order to read the coded blockcode data in the memory 310 through the bus device 320 and decodes the coded blockcode data in rows and columns to thereby obtain a decoded data and a check byte. The error correction module 340 writes the decoded data in the memory 310 through the bus device 320 and discards the check byte.

Figure 4:
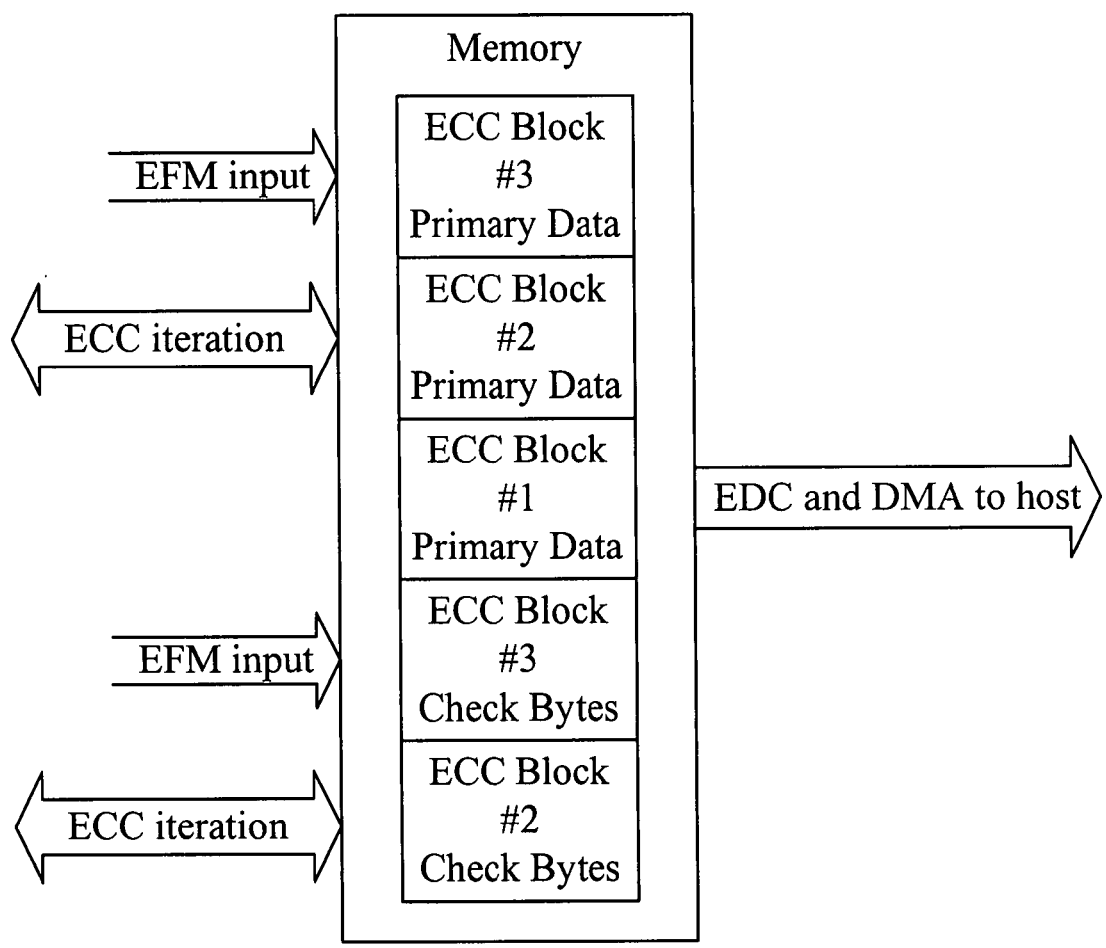
FIG. 4 is a schematic diagram of memory use in accordance with the invention.

FIG. 4 is a schematic diagram of memory usage in accordance with the invention. As shown in FIG. 4, the primary data and the check bytes of an ECC block are separated to thereby increase the use efficiency of the memory 310. For example, the primary data and the check bytes of ECC block #3 are stored in different locations of the memory 310, and thus, when the memory is allocated, only a smaller memory space is required for storing ECC block data, which can increase the use efficiency of the memory 310.

Figure 5:
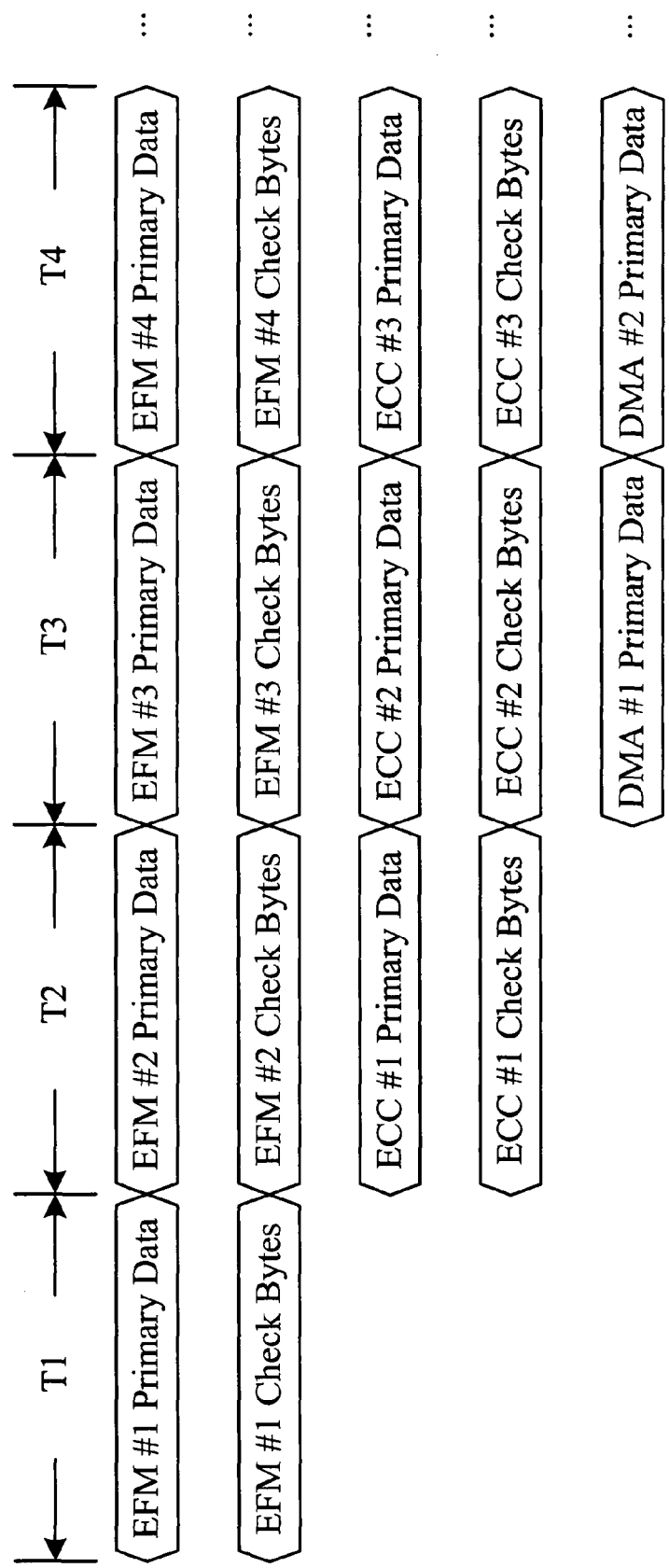
FIG. 5 is a schematic diagram of a timing of an error corrector with a high use efficiency of a memory in accordance with the invention.

FIG. 5 is a timing diagram of an error corrector with a high use efficiency of a memory in accordance with the invention. As shown in FIG. 5, at T1, an uncorrected primary data (EFM #1 primary data) and check bytes (EFM #1 check bytes) both stored in the input buffer 330 are written in the memory 310.

At T2, an uncorrected primary data (EFM #2 primary data) and check bytes (EFM #2 check bytes) both stored in the input buffer 330 are written in the memory 310. Also, the error correction module 340 performs an error correction on the previously input primary data and check bytes (EFM #1 primary and EFM #1 check bytes), and thus produces a decoded data. The error correction module 340 only writes the decoded data in the memory 310 through the bus device 320 and discards the check bytes.

At T3, an uncorrected primary data (EFM #3 primary data) and check bytes (EFM #3 check bytes) both stored in the input buffer 330 are written in the memory 310. Also, the error correction module 340 performs an error correction on the previously input primary data and check bytes (EFM #2 primary and EFM #2 check bytes), and thus produces a second decoded data. The error correction module 340 only writes the second decoded data in the memory 310 through the bus device 320 and discards the check bytes. Accordingly, the DMA output module 350 reads the decoded data (DMA #1 primary data).

In view of foregoing, it is known that the error corrector separates the primary data and check byes of an ECC to thereby increase the use efficiency of the memory 310. Also, after the Reed-Soloman decoding, the error correction module 340 only writes the decoded data back to the memory 310 and discards the check bytes to thereby save the use amount of memory. In addition, since the check bytes is discarded after decoding, the DMA output module 350 only requires the decoded data (DMA #1 primary data) in the memory 310, which can relatively save the bandwidth for memory access.

Although the present invention has been explained in relation to its preferred embodiment, it is to be understood that many other possible modifications and variations can be made without departing from the spirit and scope of the invention as hereinafter claimed.

What is claimed is:

1. An error corrector with a high use efficiency of a memory, comprising:
   a memory which stores data;
   a bus device, connected to the memory, which controls the memory for accessing;
   an input buffer which temporarily stores a coded blockcode data and writes the coded blockcode data in the memory through the bus device; and
   an error correction module, connected to the bus device, which reads the coded blockcode data in the memory through the bus device, decodes the coded blockcode data in rows and columns, and obtains a decoded data and check bytes,
   wherein the error correction module only writes the decoded data in the memory through the bus device and discards the check bytes.

2. The error corrector as claimed in claim 1, further comprising a direct memory access (DMA) output module, connected to the bus device, which reads and outputs the decoded data in the memory through the bus device.

3. The error corrector as claimed in claim 2, wherein the coded blockcode data is a linear blockcode.

4. The error corrector as claimed in claim 3, wherein the coded blockcode data is coded by a Reed-Solomon coding.

5. The error corrector as claimed in claim 1, wherein the bus device comprises:
   a data switch module which transfers data among the memory, the input buffer, the error correction module and the DMA output module;
   a bus arbiter which determines a priority of the input buffer, the error correction module, and the DMA output module, and accesses the memory.

6. The error corrector as claimed in claim 5, wherein the bus arbiter uses a fixed-priority which determines the priority of the input buffer, the error correction module and the DMA output module, and accesses the memory.

7. The error corrector as claimed in claim 5, wherein the bus arbiter uses a round-robin which determines the priority of the input buffer, the error correction module and the DMA output module, and accesses the memory.

8. The error corrector as claimed in claim 1, wherein the memory is a dynamic random access memory (DRAM).

9. The error corrector as claimed in claim 8, wherein the DRAM is a synchronous DRAM.

10. The error corrector as claimed in claim 8, wherein the DRAM is a double data rate DRAM.

11. An error corrector with a high use efficiency of a memory, comprising:
    a memory to store data which stores data;
    a bus device, connected to the memory, in order to control which controls the memory for accessing;
    an input buffer which temporarily stores an uncorrected coded blockcode data and writes the uncorrected coded block code data in the memory through the bus device;
    an error correction module, connected to the bus device, which reads the uncorrected coded blockcode data in the memory through the bus device, decodes in rows and columns, and obtains a decoded data and check bytes;
    a DMA output module, connected to the bus device, which reads and outputs the decoded data in the memory through the bus device;
    wherein the error correction module performs a correction on a primary data and the check bytes form the uncorrected coded blockcode data and produces the decoded data and the chick bytes, then only writes the decoded data in the memory through the bus device and discards the check bytes, and the DMA output module fetches the decode data associated with a previous coded blockcode data in the memory and performs a DMA operation.

12. The error corrector as claimed in claim 11, wherein the coded blockcode data is a linear blockcode.

13. The error corrector as claimed in claim 12, wherein the coded blockcode data is coded by a Reed-Solomon coding.

14. The error corrector as claimed in claim 11, wherein the bus device comprises:
   a data switch module which transfers data among the memory, the input buffer, the error correction module and the DMA output module;
   a bus arbiter which determines a priority of the input buffer, the error correction module, and the DMA output module, and accesses the memory.

15. The error corrector as claimed in claim 14, wherein the bus arbiter uses a fixed-priority which determines the priority of the input buffer, the error correction module and the DMA output module, and accesses the memory.

16. The error corrector as claimed in claim 14, wherein the bus arbiter uses a round-robin which determines the priority of the input buffer, the error correction module and the DMA output module, and accesses the memory.

17. The error corrector as claimed in claim 11, wherein the memory is a dynamic random access memory (DRAM).

18. The error corrector as claimed in claim 17, wherein the DRAM is a synchronous DRAM.

19. The error corrector as claimed in claim 17, wherein the DRAM is a double data rate DRAM.

* * * * *